(12) United States Patent
Cohen

(10) Patent No.: US 8,463,700 B1
(45) Date of Patent: Jun. 11, 2013

(54) PAYMENT AND REVENUE SYSTEMS

(76) Inventor: Morris E. Cohen, Brooklyn, NY (US)

( * ) Notice: Subject to any disclaimer, the term of this patent is extended or adjusted under 35 U.S.C. 154(b) by 317 days.

(21) Appl. No.: 12/217,298

(22) Filed: Jul. 2, 2008

Related U.S. Application Data

(63) Continuation-in-part of application No. 11/824,772, filed on Jul. 2, 2007, now abandoned, which is a continuation-in-part of application No. 09/955,464, filed on Sep. 18, 2001, now Pat. No. 7,747,523, which is a continuation of application No. PCT/US00/07457, filed on Mar. 20, 2000, now abandoned, which is a continuation-in-part of application No. 09/280,483, filed on Mar. 30, 1999, now Pat. No. 6,422,462, said application No. 09/955,464 is a continuation-in-part of application No. 09/369,902, filed on Aug. 6, 1999, now abandoned.

(60) Provisional application No. 60/958,015, filed on Jul. 2, 2007, provisional application No. 60/817,745, filed on Jun. 30, 2006, provisional application No. 60/817,746, filed on Jun. 30, 2006, provisional application No. 60/079,884, filed on Mar. 30, 1998, provisional application No. 60/095,770, filed on Aug. 7, 1998, provisional application No. 60/125,008, filed on Mar. 18, 1999, provisional application No. 60/130,600, filed on Apr. 22, 1999, provisional application No. 60/130,599, filed on Apr. 22, 1999, provisional application No. 60/138,428, filed on Jun. 10, 1999, provisional application No. 60/139,167, filed on Jun. 15, 1999, provisional application No. 60/161,283, filed on Oct. 25, 1999, provisional application No. 60/165,231, filed on Nov. 11, 1999.

(51) Int. Cl.
*G06Q 40/00* (2012.01)
*G06Q 40/02* (2006.01)
*G06Q 20/08* (2006.01)
*G06Q 20/10* (2006.01)

(52) U.S. Cl.
CPC ............. *G06Q 40/02* (2013.01); *G06Q 20/08* (2013.01); *G06Q 20/10* (2013.01)
USPC .................................................... 705/39

(58) Field of Classification Search
CPC .......... G06Q 40/02; G06Q 20/08; G06Q 20/10
USPC ..................................................... 705/35–44
See application file for complete search history.

(56) References Cited

U.S. PATENT DOCUMENTS

| | | | | |
|---|---|---|---|---|
| 5,220,501 | A * | 6/1993 | Lawlor et al. | 705/40 |
| 5,884,288 | A * | 3/1999 | Chang et al. | 705/40 |
| 5,903,881 | A * | 5/1999 | Schrader et al. | 705/42 |
| 5,991,749 | A * | 11/1999 | Morrill, Jr. | 705/44 |
| 6,138,107 | A * | 10/2000 | Elgamal | 705/39 |
| 6,236,740 | B1 * | 5/2001 | Lee | 382/119 |
| 7,747,523 | B2 * | 6/2010 | Cohen | 705/39 |
| 2001/0037295 | A1 * | 11/2001 | Olsen | 705/40 |
| 2002/0072942 | A1 * | 6/2002 | Kuykendall et al. | 705/7 |

OTHER PUBLICATIONS

Sachdev, A. et al., "Web site's so electric, you can pay your power bill series: Talk of the bay", St. Petersburg Times, Fla.: Aug. 18, 1997.*

* cited by examiner

*Primary Examiner* — Olabode Akintola
(74) *Attorney, Agent, or Firm* — Goldberg Cohen LLP; Morris E. Cohen

(57) ABSTRACT

Methods and systems for funds transfers, including revenue generating methods and systems associated therewith.

12 Claims, 4 Drawing Sheets

Jones Consulting Corp.

1234 Fifth Avenue, Suite 1000
New York, New York 10001

Telephone: 212-555-1212
Facsimile: 212-555-7396
Webbank: 001-212-555-1212-7396
Webbank: jonesconsultingcorp7396

*Figure 1*

Jones Consulting Corp.
———

1234 Fifth Avenue, Suite 1000
New York, New York 10001

Telephone: 212-555-1212
Facsimile: 212-555-7396
Webbank: 001-212-555-1212-7396
Webbank: jonesconsultingcorp7396

*Figure 2*

*Jones Consulting Corp.*
Public Webbank number: 001-212-555-1212-7396
Public Webbank number: jonesconsultingcorp7396
Private webbank number: jk8y9ioxnm29opqnbb03

*Genome Biotech, Inc.*
Public Webbank number: 001-617-555-9876-5432
Public Webbank number: genomebiotech5432
Private webbank number: hrmpmr904rrvhk8923eecqlo

*Figure 3*

JONES CONSULTING CORP.: CORPORATE WEBBANK

*MAKE A PAYMENT TO JONES CONSULTING CORP.:*

| | | |
|---|---|---|
| Amount being paid: | _____ | (Required) |
| Paid from: | _____ | (Required) |
| Memo: | _____ | (Optional) |
| Invoice number | _____ | (Optional or required, as set by Jones) |

*Figure 4*

REQUEST A PAYMENT FROM GENOME BIOTECH INC.

| | | |
|---|---|---|
| Amount Due/Requested: | _____ | (Required) |
| Requested by: | _____ | (Required) |
| Invoice number | _____ | (Optional) |
| Link to Itemized Bill | _____ | (Optional) |
| Memo: | _____ | (Optional) |

PAYMENT AND REVENUE SYSTEMS

RELATED APPLICATIONS

The present application claims the priority of U.S. Provisional Application Ser. No. 60/958,015 filed Jul. 2, 2007.

This application is also a continuation-in-part of U.S. Nonprovisional patent application Ser. No. 11/824,772 filed Jul. 2, 2007 now abandoned, which claims the priority of U.S. Provisional Application Ser. No. 60/817,745 filed Jun. 30, 2006, and the priority of U.S. Provisional Application Ser. No. 60/817,746, filed Jun. 30, 2006.

This application is also a continuation-in-part of U.S. Nonprovisional patent application Ser. No. 09/955,464 filed Sep. 18, 2001 now U.S. Pat. No. 7,747,523, which is a continuation under 35 U.S.C. §120 of PCT Application Serial No. PCT/US00/07457 filed Mar. 20, 2000 (abandoned), which PCT Application is: (a) a continuation-in part of U.S. Nonprovisional patent application Ser. No. 09/280,483 filed Mar. 30, 1999 (patented, now U.S. Pat. No. 6,422,462 B1), which claims the benefit of U.S. Provisional Patent Application Ser. No. 60/079,884, filed Mar. 30, 1998; and which is (b) a continuation-in-part of U.S. Nonprovisional application Ser. No. 09/369,902 filed Aug. 6, 1999 (abandoned), which claims the benefit of U.S. Provisional Patent Application Ser. No. 60/095,770, filed Aug. 7, 1998; and which (c) also claims the benefit of U.S. Provisional Patent Application No. 60/125,008, filed Mar. 18, 1999, U.S. Provisional Application No. 60/130,600, filed Apr. 22, 1999, U.S. Provisional Application No. 60/130,599 filed Apr. 22, 1999, U.S. Provisional Application Ser. No. 60/138,428 filed Jun. 10, 1999, U.S. Provisional Application Ser. No. 60/139,167 filed Jun. 15, 1999, and U.S. Provisional Application Ser. No. 60/161,283 filed Oct. 25, 1999, and U.S. Provisional Application Ser. No. 60/165,231 filed Nov. 11, 1999.

All rights of priority to each of those applications is claimed to the fullest extent available, and the entire contents of all of those applications are fully incorporated herein by reference.

FIELD OF THE INVENTION

The present invention relates to new systems for payments and revenues.

BACKGROUND OF THE INVENTION

In prior applications, the present inventor has disclosed systems for electronic commerce using a system of web based banks over the Internet. Further thereto, additional methods for generating revenue using such systems are disclosed herein.

SUMMARY OF THE INVENTION

In accordance with a series of embodiments of the invention, various systems are provided for transferring funds, paying third parties, forwarding invoices, and so forth. In preferred embodiments, these systems utilize public and private "bank accounts", the public and private bank account being accessible via the world wide web. Preferably, pairs of public/private bank accounts are provided to each entity with the private account only being accessible only by the entity's authorized users, and the public account being accessible by any member of the public as a website on the Internet. By using exchanges of public addresses, payments can be made and invoices transferred via a system that is webbased and accessible over the Internet.

In further embodiments, systems for generating revenue, making loans, extending credit and so forth, whether using the private/public system or independently are provided as well, as disclosed in further detail below.

BRIEF DESCRIPTION OF THE FIGURES

FIG. 1 is an illustration of one embodiment of the invention utilizing the Webbank™ numbers of the present invention, wherein that Webbank™ number is a public account number which can be listed on a user's letterhead.

FIG. 2 is an illustration of a further embodiment of the invention using public and private webbank numbers.

FIG. 3 is an illustration of a further embodiment of the invention, wherein the invention is used to pay a public webbank account.

FIG. 4 is an illustration of a further embodiment of the invention, wherein the invention is used to send invoices to a public webbank account to request a payment from a third party.

DETAILED DESCRIPTION OF THE INVENTIONS AND THE PREFERRED EMBODIMENTS

In accordance with a first series of embodiments of the invention, various systems are provided for transferring funds, paying third parties, forwarding invoices, and so forth.

In accordance with these inventions, information relating to funds transfers, payments, and invoices, is transferred between parties using a global computer system. The system uses computers in a global computer network, such as computers on the Internet network within the United States and/or within other countries, to transfer information pertaining to party webbank accounts. Such information includes transfers of funds, payments, forwarding of invoices, payments of those invoices, and so forth using that global computer network.

Further to various embodiments of the invention, public and private webbank accounts are provided as discussed below. Preferably, users are each provided with a public and private webbank account, with the private account being accessible only by the user and authorized members of the user's entity and the public account being accessible by any member of the public.

In accordance thereto, users send information from their private webbank account addressed to a recipient's public webbank account. That information forwarded to the recipient's public account gets forwarded and stored in the recipient's private account. At the same time, such information in the recipient's private account is associated with the sender's public account information (not the sender's private account information). In this manner, the parties use their public account information for communication, while the private account numbers of the parties are maintained confidential at all times. The overseeing bank however, associates each party's private account number with its public account number (or numbers), such that information sent to a public account number is routed to the party's private account number. Likewise, and vice versa, information sent from a party's private account number does not display that private account number but only the party's public account number.

Example 1

In this illustration, a company's bank account number for receipt of funds corresponds to a simple webaddress, which can be listed on the company's letterhead, for example in FIG. 1.

As shown in FIG. 1, Jones' bank account number on the interne (its "webbank number") is listed on its letterhead and is a public number that the firm can publicly distribute to any of its clients so that they can use any webbrowser to pay them, or so forth. This number (e.g. "001-212-444-1212-7396" or just "001-212-444-1212" or "jonesconsultingcorp7396" or so forth) is input after the webbank's webaddress to access the user's public webbank account. For example, the user can access Jone's account to make a payment at "www.webbank.com/001-212-444-1212-7396" or at "www.webbank.com/001-212-444-1212" or www.webbank.com/jonesconsultingcorp7396", or at corresponding addresses at www.publicwebbank.com, or so forth, as applicable.

In other words, the webbank number (also referred to as a "bille", "billi" or "billy" number) does for payments what the telephone number does for voice communication, and what the fax number does for data communications. Just as any company can list a simple number to receive phone calls or faxes, so too, they can list a single simple number or alphanumeric sequence on their letterhead and websites to receive money. In further embodiments, this number can also be used to receive bills, such as formal invoices or informal requests for payment.

Preferably, the webbank number provided on letterhead corresponds to a "deposit only" account, meaning that anyone can send money to it using that number. Anyone can access that bank over the Internet, and can send money to that bank.

At the same time, in further preferred embodiments, that number can never be used to withdraw funds. No one (not even Jones Consulting) can use that number to make a payment or to make a withdrawal. That webbank number is a public account number which can receive funds (or bills) from anyone, but cannot be used to send funds.

Preferably, the webbank number is hosted at a bank, and any information received through that webbank is posted on Jones' central webbank', which is in fact a bank that can be used to pay funds. That central bank number is kept secret and is only provided to authorized members of Jones Consulting, and is not given out to the public).

(Further preferably, a tiered hierarchy is actually provided, with higher and lower level access numbers. For example, an authorized employee can be given a lower level access number which is active as long as that employee is at the firm, but can be deactivated when the employee leaves, while leaving the higher level access number intact for the company president, or so forth).

In other words, the bille number can be given to anyone without any concern that the number will be used to make an unauthorized payment, in contrast to a credit card number or bank account number. Unlike a credit or debit card, the bille number is simply not capable of being used to pay anything—it can only be used to receive funds. In this manner, the account number can be made fully public, without any risk of fraud or misuse.

A bille number can thus be used to immediately access that company's webbank over the Internet.

Payments can be made in any one of several simple ways, whether through, for example, (1) the recipients' public webbank; or (2) the paying party's central bank; (3) through a bill received; or (4) through any telephone (and particularly a cell phone).

Further thereto, there is no need for use of account numbers and routing numbers as is the case with traditional checks, since every webbank account directly corresponds to a webaddress.

Example 2

Webbank Numbers

The example of webbank numbers shown in FIG. 2 further illustrates additional embodiments of the system.

In one embodiment, the "public webbank number" of each of the companies in FIG. 2 is a simple strings of digits, letters or the combination thereof. Although any numeric string can used, preferably it corresponds to the company's main phone number (including international dialing codes) or company name. That number or name is followed by a string of appended digits or other characters, so that the webbank number is a unique string of digits associated with that company. In this manner, clarity is preserved in the event that the company later changes numbers and someone else is assigned that telephone number, or in the event that the company changes names, merges, or so forth.

This first webbank number is "public" in that it is provided for the consumer to give out to anyone. In fact, it is intended that the public webbank number be listed on letterhead just as a company would list its phone and fax numbers. This public number can be based on a regular telephone number, on a cell number, on an existing webaddress, on an existing street address, or so forth.

The second webbank number is "private", and corresponds to a complex alphanumeric string which is given to the company for use in communications with the metabank only. This account number is only provided to the metabank, and is never provided to outside parties.

Example 3

One Embodiment of a Payment Method

Since every webbank account directly corresponds to a webaddress, all one needs is the webbank number from letterhead (or an email or so forth) to send funds. For example, assume that a client of Jones (Genome Biotech, Inc.) received a bill in the amount of $1500.00 for consulting work that Jones conducted on Genome's behalf To pay Jones, Genome merely goes onto the Internet, and types Jones' webbank number into the address line of Microsoft Explorer (or any other webbrowser) as follows: www.webbank.com/001-212-555-1212-7396. This webaddress accesses a website at the metabank—i.e. a website which is hosted by the bank—not by Jones.

At the metabank, a website is presented which is known as the webbank, or millibank or under any other brand name or other designation. For example, the following fields of FIG. 3 can be presented at the website, as shown therein.

At that website, Genome inputs the amount it is paying, using the address of Genome's private webbank. The bank then instantaneously conducts a transfer of funds (which is actually, preferably an intra-bank transfer, in which funds are moved from Genome's webbank account to Jones' webbank account).

To make payments, a party uses its "private account number" for webbank branch at the metabank. That private account number is never given out by that party to anyone but the metabank.

However, since all webbanks are hosted by the metabank, anyone can input his or her private account number at any "public" webbank site without worrying that the private account is being compromised, since the "public" webbank site is itself being hosted by the metabank. Thus, the metabank uses that private account number to access the funds, but no third party ever sees that account number.

For security purposes, different employees, divisions, etc. of a company can be given their own private webbank numbers which are subaccounts of the master private webbank number. Furthermore, this is all accomplished by the software (which is preferably embedded in the browser, but otherwise is a standalone application), the software having the private number programmed in the background, and being programmed to recognize the webaddress of a true metabank or webbank site that is hosted by the bank. Any non-authentic (i.e. fraudulent site) is rejected by the software in the browser, such that the software will not transfer funds to any such site lacking a true webbank address. In this manner, the software further prevents fraud through phishing or so forth, including such schemes wherein unscrupulous individuals use webaddresses close to the spelling of another party to divert funds from that party. (Likewise, the webbank preferably recognizes the digital certificate of the software accessing it further prevent tampering of fraud).

After the transfer, the metabank then posts an entry at Jones' central webbank indicating that a payment was received from Genome.

Example 4

Requests for Funds

The same system and the same number is used to send bills. In other words, one can also send a bill to the public webbank number, as shown in FIG. 4:

By inputting Genome's public webbank number, one can access a further icon which is used to request a payment or send an invoice. At that public webbank address, Jones can input its webbank number (which, again, is accomplished by the software, as discussed above) along with a request for funds. This input can be Jones' public number (e.g. if the information is to be directly transferred to Genome without modification), or can be Jones' private number (e.g. if the information is processed through the metabank, which then can convert data into Jones' public webbank number which is then provided to Genome).

Preferably, an invoice can be attached if desired (e.g. as a pdf), and/or the details of the invoice can be electronically posted on the appropriate webbank or website of Genome's designated employee for accounts receivable. Data relating to the invoice can also be posted for reminders to the recipient and/or sender. Such information can include, but is not limited to, the date payment is due, interest charges and other charges upon a certain date, frequency of reminders for payment, and so forth. Such information can post on either or both party's webbanks, such as the first and/or party's private webbanks and so forth. Additionally, or alternatively, relevant data can be sent by email. Thus, in this embodiment, a webbank number can also be used to submit a payment request and post related documents (such as invoices) and data associated with that payment request.

Accordingly, as described above, any phone number or webaddress can become a bank account number; i.e. any phone number or website or even any object can be turned into a bank account. If desired, one can link a series of webbanks together (e.g. so that a series of public addresses funnel into one private address).

Likewise, two parties can link their webbanks together so that invoices sent from a first party's private webbank is forwarded to a second party's public webbank for posting on that second party's private webbank. Further thereto, data is stored in association with the first party's party's webbanks relating to second party webbanks that the first party does business with. Furthermore, even though the data was sent from the first party's private webbank, that posting on the second party's webbank is preferably automatically associated with data relating to the first party's public webbank so that the second party only receives information regarding the sender's public webbank (not the private one), and so that payment can be made back to the first party at its public webbank address.

Furthermore, pursuant to the inventions, any phone number, webadddress, home address, or so forth, can be turned into a bank account. Likewise, any phone number, webaddress, physical address, object or so forth can correspond to a bank account; such that if you know the phone number, webaddress, or so forth you can send money there. Furthermore, any cell phone or other telephone can be used to send or receive funds associated therewith.

The inventions also allow payments in web 2.0 type collaborations, due to the possibility of creating financial pools, networks, subaccount structures, and so forth.

The inventions also provide considerable flexibility, allowing users to create as many accounts as they want, including creating different accounts for different things or purposes to allow enhanced organization, recordkeeping and tracking.

In accordance with a further embodiment of the present invention, the present invention (and/or OTO and CPF systems of U.S. Nonprovisional patent application Ser. No. 11/824,772 filed Jul. 2, 2007), can be used as a marketplace/payment mechanism for myspace, youtube, blogs, and any other services.

In a further embodiment, an icon is provided which can be integrated into any webpage (e.g. as part of a toolbar which appears at the top or side of the page, or in another desired location), providing a payment mechanism for anyone who has a website.

In addition, it is noted that since the webbank corresponds to a webaddress and a unique alphanumeric sequence, a webbank account link can be integrated into any data stream. For example, webbank technology into product placement (webbank info integrated into the data stream). It can be integrated into videos, audio streams and so forth.

Revenue Generating Methods

In further embodiments of the invention, various new revenue generating methods and financial systems are provided as discussed below.

Advertising

In one aspect of the invention, some revenue is generated by advertisement sales. Eventually, it is intended that targeted advertisements be used, i.e. advertisements geared to the types of payments being made by the webbank owner. For example, for those consumers that frequently use their webbank to make electronics purchases, advertisements from electronics vendors will be shown to them when they access their site. By correlating 'payment types' with 'advertiser types', higher premiums can be charged to advertisers, since they are being paired with consumers more likely to use their types of products or services.

Lending Pools

In a further feature available to subscribers, any webbank owner can place some of his or her funds in a lending pool. There are various types of pools that the bank will execute, such as a credit card "pool", a pocket loan pool, and so forth. Thus, one function of the metabank is to serve as a credit card company or as a facilitator of various forms of transactions involving lending, investment, credit, and so forth. In this manner, the company offers a series of new financial products referred to herein as "credit pools" or "lending pools", as further described below.

Capital Secured Credit Pools

In this product, the webbank owner put funds into the pool, with that pool being used to secure credit provided to consumers via the Webbank credit card. The revenue coming in from consumers using that credit card is split between the metabank and the webbank owners.

As all credit is secured by the funds invested by the webbank owner, the Capital Secured product is significantly more secure to the bank than a traditional credit card. The product is priced with a portion of the revenue being used to pay for insurance of the funds invested by the webbank owner, and a portion being used to fund customer service and support. (Customer service is either provided by the metabank directly or is outsourced). The remaining profit stream is split between the webbank owners and the metabank.

A purely hypothetical example would be a webbank credit card charging 14% interest, of which 6% goes to the webbank owners who put money into the fund, 6% goes to the metabank, and 2% goes to customer service charges and insurance against defaults. The example is provided merely for illustration purposes—actual interest charged and pricing would, of course, be computed based upon levels of risk associated with the credit worthiness needed to obtain a card, insurance costs, and so forth. Likewise, the example does not include other relevant sources of revenue such as fees charged to merchants and to card holders.

The metabank benefits by receiving a portion of the revenue stream coming in with no risk of loss on its own side, since the metabank does not need to invest or risk any of its own funds. All revenue to the metabank is also "free" (without cost to the metabank), since the credit card company is funded by interest and fees paid by the credit card holders, by merchants, and by the investment of the webbank owners in the credit card company.

Webbank owners, on the other hand, benefit from this new product by being able to "own" a credit card company, with the attendant high rates of return involved. They can shift a portion of the funds in their webbank into this product and thereby obtain higher rates of return than traditional savings accounts. Credit worthiness requirements for those applying for the card influences the rates (or rates) of interest charged, and reduce bad debt, with insurance being further used (or available) to hedge the investment of webbank owners against loss. In addition, defaults are spread over the large number of webbank owners participating in the pool, limiting its effect on any one owner.

Credit Secured Credit Pools

This product is similar to the Capital Secured Credit Pools discussed above, except that instead of investing funds in the pool, webbank owners invest their credit into the pool. In other words, the webbank owner puts some of his or her own credit in the pool, with the pool lending a portion of that credit out to others. In this way, the webbank owner makes a rate of return off of the lending of her credit, without needing to put in actual funds.

For example, a webbank owner can apply for participation in this pool and be approved for a thousand dollars ($1000.00) worth of credit. That thousand dollars of credit is then placed in the pool and is lent out to approved credit card applicants. From the perspective of the metabank, the credit is essentially being secured by both the credit card applicant and the webbank owner.

From the perspective of the webbank owner, she is essentially splitting up her credit and sub-lending a portion of that credit out to other consumers. Thus, without putting in actual funds or investment, the webbank owner can obtain a revenue return from having a good credit rating or score.

(The preference is to begin with policy of lending to well qualified applicants (based on such factors as a high FICO score), and by distributing the risk of default over the entire pool, so that the risk of loss to the webbank owner is limited or minimized. Eventually, higher risk pools may be provided with lending to lower credit applicants at higher rates for greater rates of return, but with less security of investment, i.e. greater risk that some portion of the webbank owner's credit in the pool will need to be accessed to cover defaults, resulting in a monthly fee to the webbank owner for participation in the pool. The monthly fee is itself linked to an interest fee charged by the metabank on the credit that has to be accessed, which is deducted from the return on investment generated by non-defaulting credit card applicants. Likewise, in another higher risk version of this pool, the webbank owner can reduce or forego insurance and guarantee the credit partially or entirely, which results in higher rates of return, but increased risk in that some of the credit 'invested' will need to be paid into the fund in actual funds from time to time to cover defaults.)

From the perspective of the credit card applicant, he or she is receiving a slightly better credit rate, since the webbank owner's credit essentially serves as a co-guarantor of the funds lent.

From the revenue perspective, the incoming revenue stream is split between the webbank owners and the metabank. A lower rate of return is provided to the webbank owner on this product, since the webbank owner is not securing the credit with actual funds, but with his or her own credit. Higher rates of insurance are charged to the webbank owner as a result, which reduces the interest obtained by the webbank owner. However, no actual capital needs to be invested by the webbank owner, with his or her credit score serving in place of a capital investment. In other words, the webbank owner makes revenue by serving as a guarantor. At the same time, the metabank still makes its share of the revenue, with no risk or cost on its side.

Any of these pools, whether the capital secured or credit secured ones, can be designed with the option of low risk, medium risk or higher risk investments, with different rates of return for each.

Real Estate Secured Pools

This product is a variation on the Capital and Credit Secured Pools in which funds or credit are invested by the webbank owners, with the pooled funds or credit being used by the webbank to purchase real estate. In this manner, a webbank owner can own a small percentage of the value of a particular piece of real estate (or of all of the real estate in a pool), with his or her shares being relatively liquid and secured by the property purchased. The metabank likewise owns a percentage of the real estate. Title to the real estate is owned by the metabank, and the value of each webbank owners' share at a given time is determined by the market value of the real estate at that time, and by whether the webbank owner initially invested funds or credit.

Miscellaneous Pools

In the same manner, other pools can eventually be created for particular types of investments or physical objects. For example, the same principles can likewise be used for "hard money" investments, for small "pocket loans" of the type currently popular in Japan, for cars, and so forth.

Thus, in various embodiments, users can engage in new forms of financial transactions through the company. For example, any individual or company can make money off of its credit or credit rating. That credit can be lent out to someone or so forth. In some embodiments, a party can simply use its credit or so forth (making less off of it, but not putting in any money), or can split up its credit (i.e. a credit line) and sub-lend that credit line or parts of it out; or so forth.

Additionally or alternately, any webbank owner can put resources into the company (whether funds, credit, or other assets) which is then lent out by the bank. Thereby individuals or other companies can in a virtual sense thereby "own their own credit card company".

Having described the invention with respect to particular embodiments, it is to be understood that the description is not meant as a limitation, since numerous other modifications and variations may be made to the inventions or may suggest themselves. It is intended that the present invention and application cover all such modifications and variations. Moreover, the information in each paragraph relates to and is intended to be used in conjunction with the inventions as disclosed in all other paragraphs herein and in conjunction with the information presented in the related applications.

What is claimed is:

1. A system for transferring funds, comprising,
a plurality of webbanks, said plurality of webbanks comprising a first webbank and a second webbank;
said first webbank comprising a first website hosted on a server for the use of a first webbank owner, said first website having funds of said first webbank owner associated therewith;
wherein said first webbank has a first webaddress associated therewith and is accessible by said first webbank owner over the Internet using said first webaddress;
said second webbank comprising a second website hosted on a server for the use of a second webbank owner;
wherein said second webbank has a second webaddress associated therewith and is accessible over the Internet via input of said second webaddress into a web browser, such that said second webaddress is both the address of a website of said second webbank owner, and is an account number which acts as an addressible destination over the Internet for the transfer of funds thereto; and
wherein said first webbank owner has access to said first webbank to transfer funds between said first webbank owner and said second webbank owner, such that said first webbank owner's provision of said second webaddress at said first webbank causes funds to be transferred between said first webbank and said second webbank;
and wherein said second webaddress comprises a telephone number or a fax number of said second webbank owner.

2. A system as claimed in claim 1, wherein said first webaddress comprises a telephone number or fax number of said first webbank owner.

3. A system as claimed in claim 1, and wherein said first webaddress comprises a telephone number of said first webbank owner, and said second webaddress comprises a telephone number of said second webbank owner.

4. A system as claimed in claim 1, and wherein said first webaddress comprises a fax number of said first webbank owner, and said second webaddress comprises a fax number of said second webbank owner.

5. A system as claimed in claim 1, wherein one of said first webaddress and second webaddress comprises a telephone number of its corresponding webbank owner, and the other of said first webaddress and second webaddress comprises a fax number of its corresponding webbank owner.

6. A system as claimed in claim 1, wherein at least one of said first webaddress and said second webaddress comprises its corresponding webbank owner's name.

7. A system as claimed in claim 1, wherein said first webaddress comprises said first webbank owner's name, and said second webaddress comprises said second webbank owner's name.

8. A system as claimed in claim 1, wherein a transfer of funds between said first webbank and said second webbank causes changes to loan records associated with at least one of said first webbank and said second webbank.

9. A system as claimed in claim 1, wherein a transfer of funds between said first webbank and said second webbank, causes changes to loan records associated with both said first webbank and said second webbank.

10. A system as claimed in claim 1, wherein said first webbank and said second webbank are hosted on the same server.

11. A system as claimed in claim 1, wherein said first webbank and said second webbank are hosted on different servers.

12. A system as claimed in claim 1, wherein said second webbank corresponds to a lending pool.

* * * * *